United States Patent [19]
Erdman et al.

[11] Patent Number: 6,022,150
[45] Date of Patent: Feb. 8, 2000

[54] FIBER OPTIC CONNECTOR

[75] Inventors: David Donald Erdman, Hummelstown; Jeffrey Paul Davis, Carlisle; Randy M. Manning, Cumberland, all of Pa.

[73] Assignee: The Whitaker Corporation, Wilmington, Del.

[21] Appl. No.: 08/846,321

[22] Filed: Apr. 30, 1997

[51] Int. Cl.[7] .............................. G02B 6/38; G02B 6/255
[52] U.S. Cl. .................................. 385/81; 385/95; 385/62
[58] Field of Search .................................. 385/60, 62, 65, 385/66, 68, 78, 81, 83, 84, 139, 95, 96, 97, 98

[56] References Cited

U.S. PATENT DOCUMENTS

| | | | |
|---|---|---|---|
| 4,097,129 | 6/1978 | Wellington et al. | 350/96.15 |
| 4,718,745 | 1/1988 | Strait, Jr. | 350/96.21 |
| 4,735,482 | 4/1988 | Yoshida et al. | 350/96.2 |
| 4,743,084 | 5/1988 | Manning | 350/96.21 |
| 4,923,274 | 5/1990 | Dean | 350/96.21 |
| 4,964,685 | 10/1990 | Savitsky et al. | 350/96.2 |
| 5,018,818 | 5/1991 | Barlow et al. | 350/96.2 |
| 5,040,867 | 8/1991 | De Jong et al. | 385/60 |
| 5,131,063 | 7/1992 | Monroe et al. | 385/78 |
| 5,177,808 | 1/1993 | Satake et al. | 385/98 |
| 5,241,613 | 8/1993 | Li et al. | 385/78 |
| 5,257,333 | 10/1993 | Nodfelt | 385/64 |
| 5,381,500 | 1/1995 | Edwards et al. | 385/78 |
| 5,390,270 | 2/1995 | Hanzawa et al. | 385/81 |
| 5,394,496 | 2/1995 | Caldwell et al. | 385/70 |
| 5,748,819 | 5/1998 | Szentesi et al. | 385/60 |

FOREIGN PATENT DOCUMENTS 2096348A 10/1982 United Kingdom ............. G02B 7/26

OTHER PUBLICATIONS

International Publication No. WO87/07035, Nov. 19, 1987, Classification number G02B 6/38.

International Search Report, PCT/US98/07943, dated Aug. 13, 1998.

*Primary Examiner*—John D. Lee
*Assistant Examiner*—Victoria D. Hao

[57] ABSTRACT

A fiber optic connector comprises a housing (4) retaining a ferrule assembly (1). The ferrule assembly (1) comprises a generally tubular rear portion defining a rear passage (11) along a longitudinal axis (20) of the ferrule assembly (1). A clamping insert (12) and a sleeve (13) are disposed within the rear passage (11). The sleeve (13) telescopically receives the insert (12) and exerts a radial force on the clamping insert (12) to align and retain a terminating fiber.

36 Claims, 8 Drawing Sheets

FIBER OPTIC CONNECTOR

FIELD OF THE INVENTION

The present invention relates to fiber optic connectors and splicers and more particularly to fiber optic connectors and splicers having mechanical fiber retention.

BACKGROUND OF THE INVENTION

Fiber optic connectors employing elements to mechanically retain a terminating fiber are known. U.S. Pat. No. 5,381,500 to Edwards et al. discloses an elastomeric insert disposed within a fiber optic ferrule that receives a terminating fiber through an aperture in the insert. An axial displacement member has a bore coaxial with the aperture in the insert. The bore receives the terminating fiber and the axial displacement member compacts the insert in a constriction in the ferrule. In response to compaction, the aperture in the insert radially compresses the fiber, retaining it. Advantageously, the mechanical fiber retention permits straight forward field assembly by obviating the need to handle epoxy and curing ovens during field termination. In an embodiment of a fiber optic connector according to the teachings of the invention disclosed in U.S. Pat. No. 5,381,500 and subsequent to fiber retention, a presentation endface of the fiber in the fiber optic connector is cleaved and polished to complete the connector termination. The polishing process requires skilled labor and in certain cases, special equipment. It is desirable to omit performance of the polishing step in the field by preparing the presentation endface of the fiber optic connector at a factory location.

U.S. Pat. No. 4,743,084 to Manning discloses a fiber stub disposed in a fiber optic ferrule and having a pre-polished presentation endface. A terminating fiber is brought into mating contact with a splicing endface of the fiber stub to terminate the fiber optic connector. A radial crimp is applied to complete termination of the fiber optic connector and to retain the fiber in mating relation with the splicing endface of the fiber stub. Advantageously, in an embodiment of a connector according to the teachings of the U.S. Pat. No. 4,743,084, the presentation endface of the fiber stub may be polished prior to field termination to achieve the benefits of high quality endface finishing while reducing the field termination time. Disadvantageously, the radial crimp must be very carefully controlled to assure appropriate fiber retention and alignment.

U.S. Pat. No. 5,040,867 issued to de Jong et al. discloses a fiber optic connector having a pre-polished fiber stub at a presentation endface and a mechanical fiber retention system in which a tab of a frame extends through a slot in a ferrule. A slider positioned over the housing is slid axially forward and engages the tab urging the tab radially inward through the slot to center the connector. Disadvantageously, the radial force applied to the fiber as the slider is positioned over the tab is unevenly distributed and may result in misalignment and/or insufficient fiber retention. Insertion loss of the connector is partially determined by the alignment of the terminating fiber to the splicing endface. The mechanisms internal to the connector, therefore, should perform fiber to fiber alignment as well as fiber retention. It is desirable, therefore, to improve the fiber to fiber alignment and improve the repeatability of the termination process in a pre-polished fiber optic connector.

Accordingly, there is a need to provide a fiber optic connector that may be easily and reliably field terminated and to provide one that is less sensitive to installation process variations. It is an advantage if an improved fiber optic connector were also interchangeable with one or more known coupling formats in order to achieve manufacturing economies of scale.

SUMMARY OF THE INVENTION

A fiber optic connector comprises a housing retaining a ferrule assembly. The ferrule assembly comprises a hollow rear portion defining a rear passage along a longitudinal axis of the ferrule assembly and has a mechanical fiber retention system disposed within the ferrule assembly. The mechanical retention system comprises a clamping insert and a sleeve disposed within the rear passage. The sleeve receives the insert in telescopic engagement and exerts a radial force on the clamping insert.

DETAILED DESCRIPTION OF EMBODIMENTS OF THE INVENTION

Figure 1:
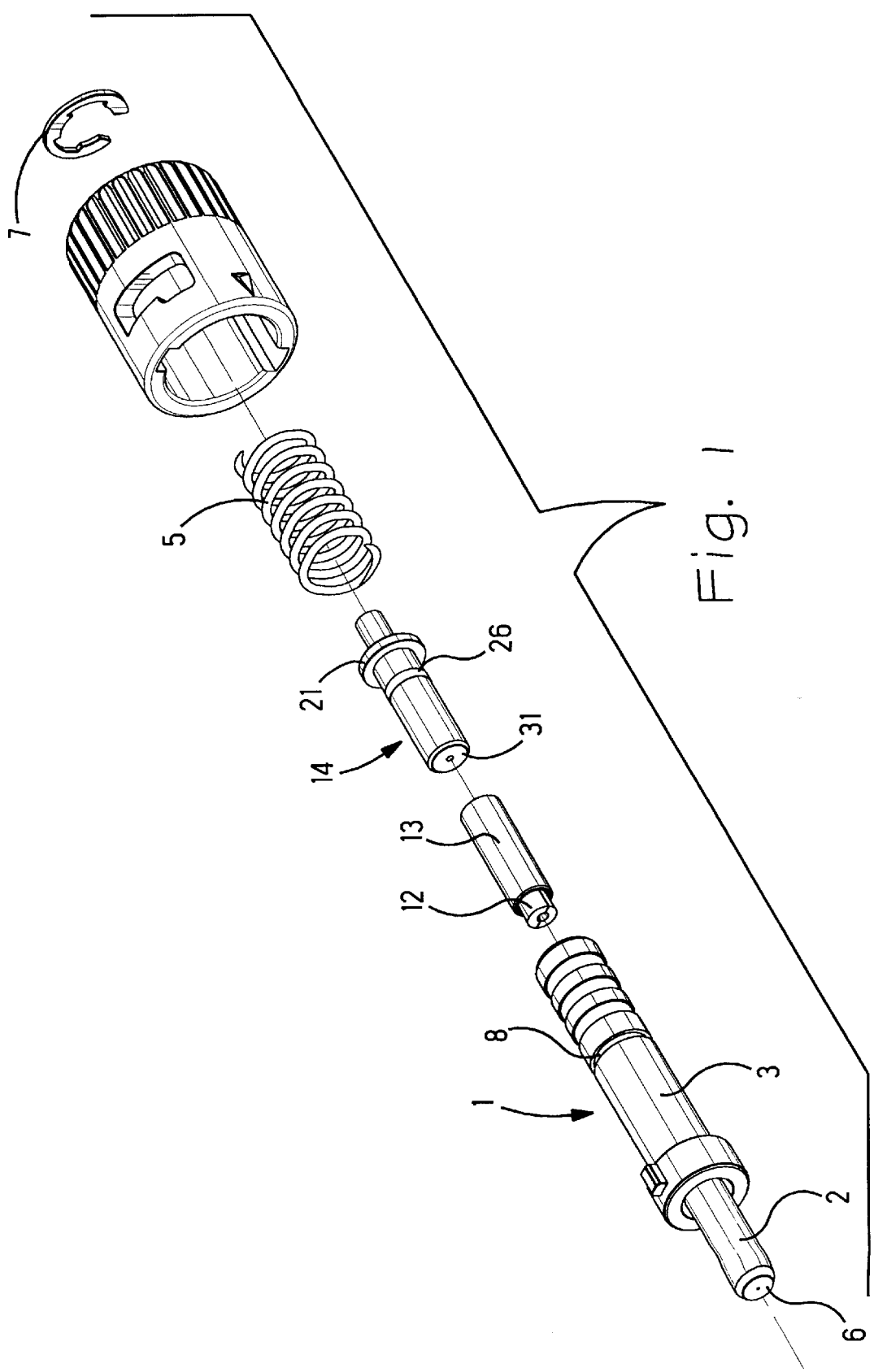
FIG. 1 shows an exploded perspective view of an ST style ("ST" is a trademark of AT&T) fiber optic connector according to the teachings of the present invention.
Figure 2:
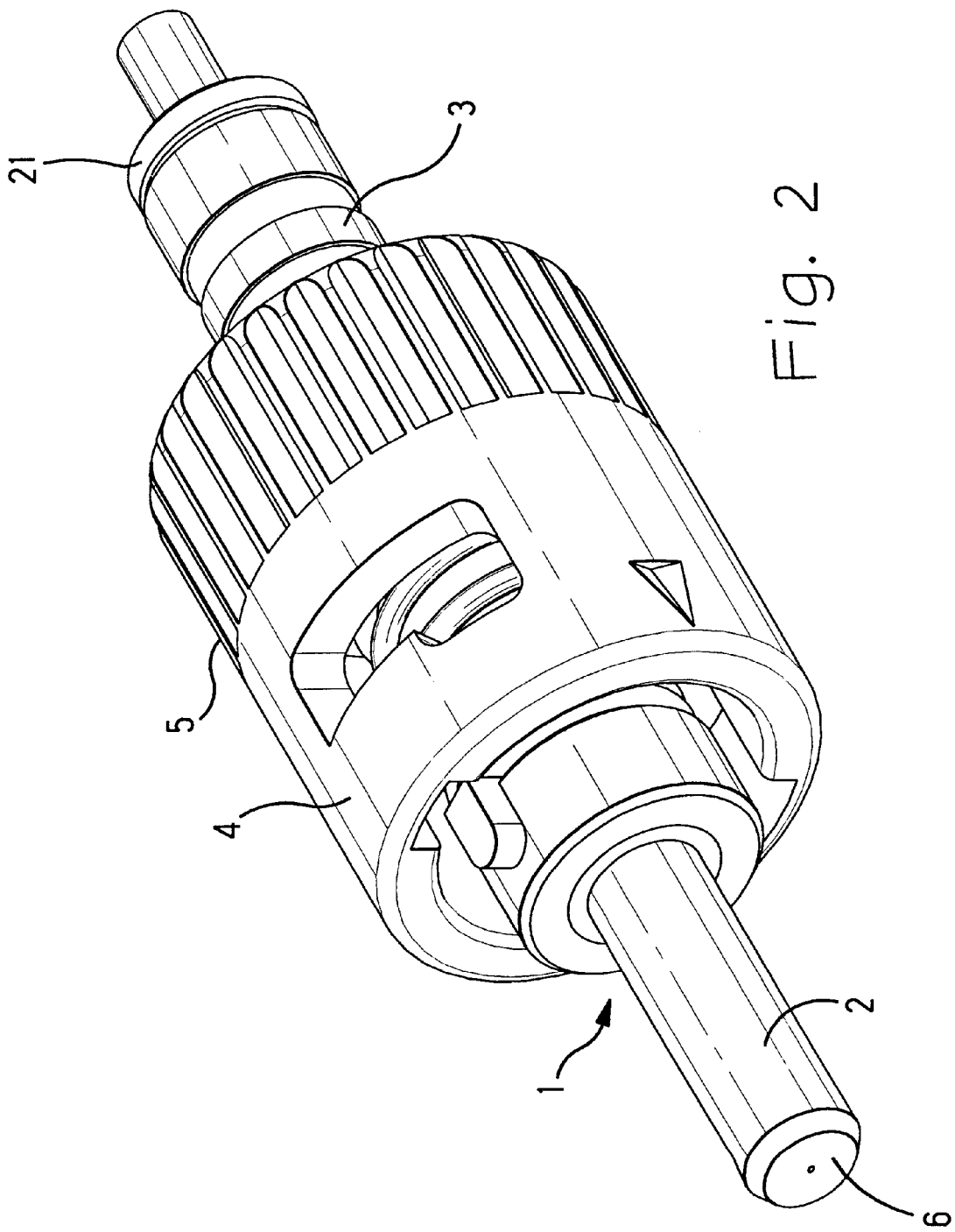
FIG. 2 shows an assembled perspective of the fiber optic connector shown in FIG. 1.
Figure 3:
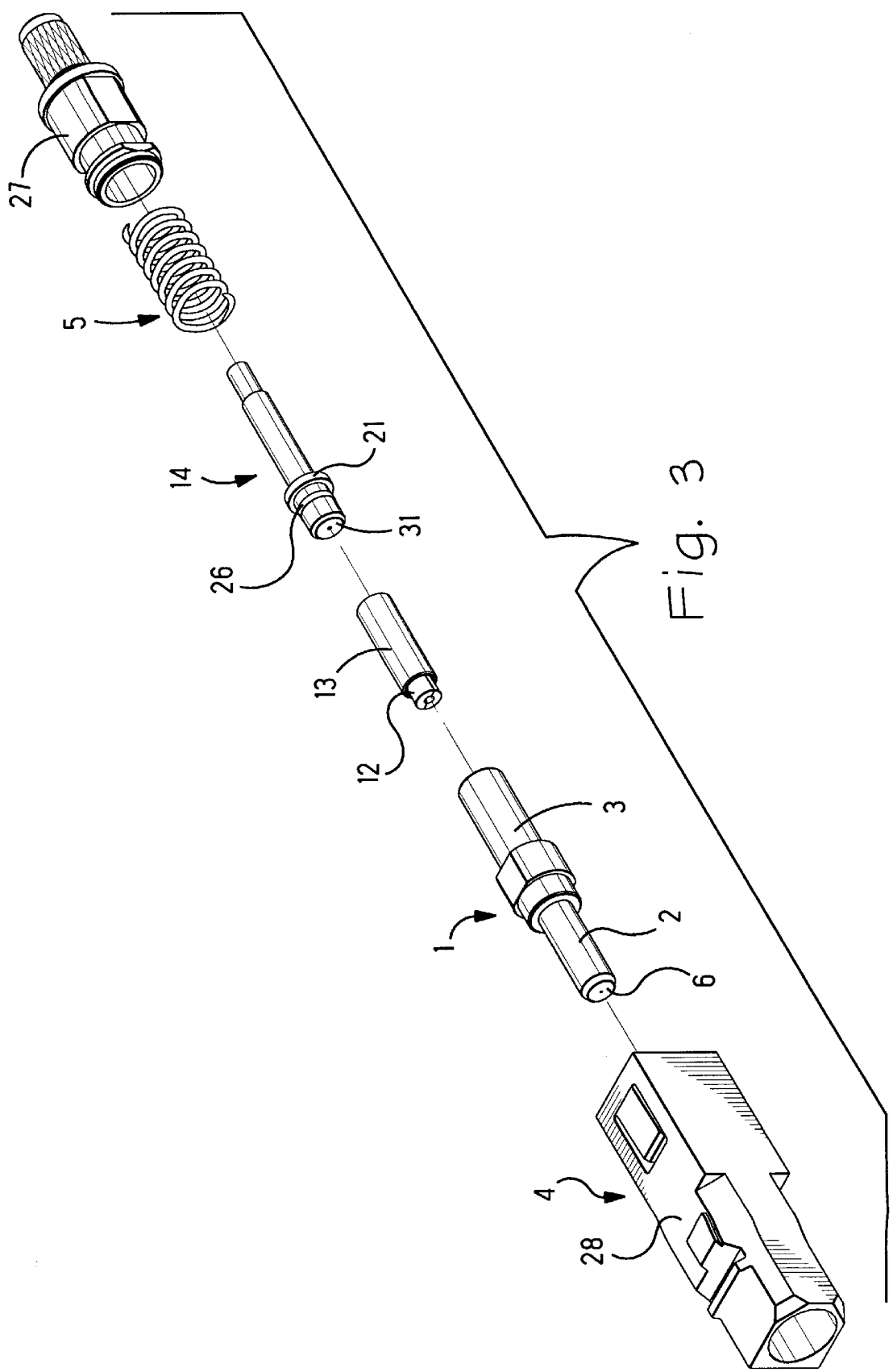
FIG. 3 shows an exploded perspective of an SC style fiber optic connector according to the teachings of the present invention.
Figure 4:
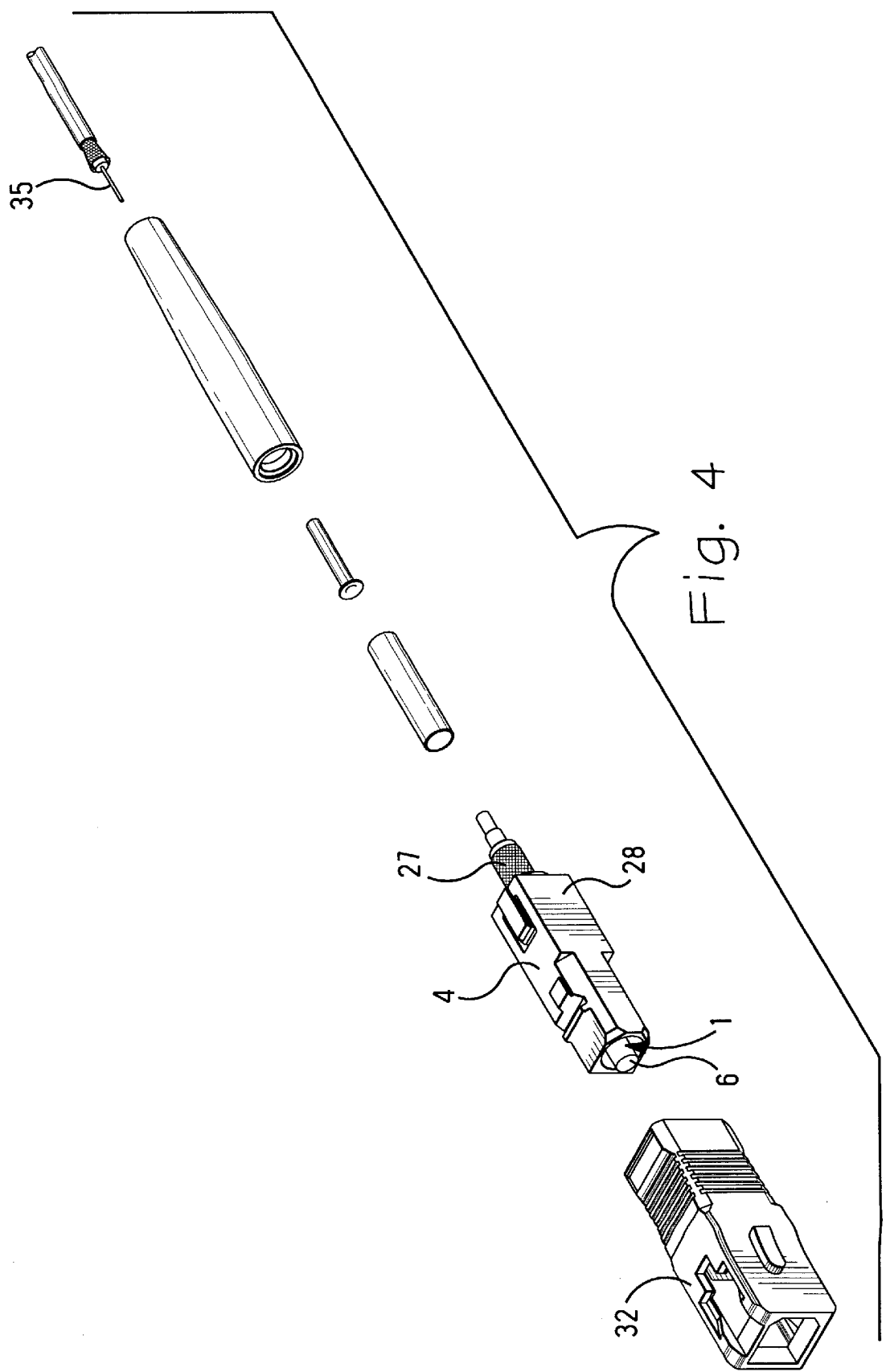
FIG. 4 shows an assembled perspective of the fiber optic connector shown in FIG. 3.
Figure 6:
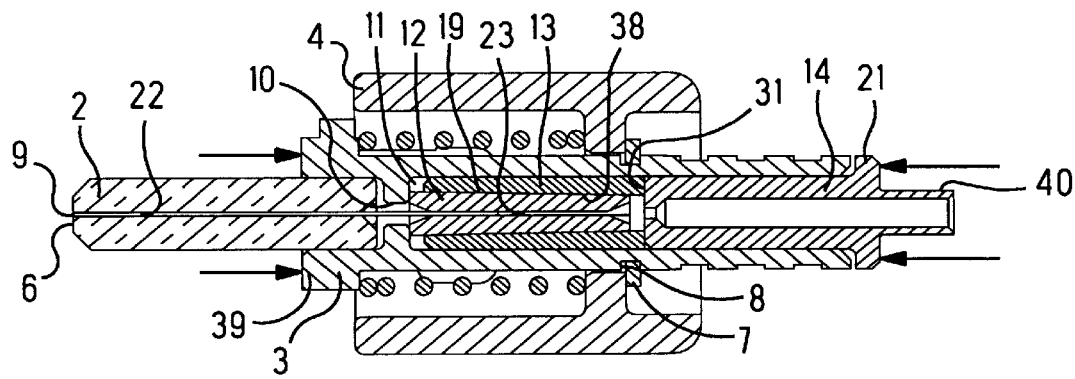
FIG. 6 shows an assembled cross section of an ST style fiber optic connector according to the teachings of the present invention in an actuated state.

With specific reference to FIGS. 1 through 4 of the drawings, there is shown two embodiments of a fiber optic connector according to the teachings of the present invention in which a ferrule assembly 1, comprising a ferrule capillary 2 and a ferrule body 3, is retained in a housing 4. Spring 5 biases the ferrule assembly 1 within the housing towards a presentation endface 6 of the ferrule assembly 1. FIGS. 1 and 2 illustrate an ST style fiber optic connector assembly comprising the ferrule assembly 1 and the spring 5 held within a conventional bayonet style coupling nut 4, the assembly retained by C-ring 7 held in groove 8. FIGS. 3 and 4 show an SC style fiber optic connector assembly comprising the ferrule assembly 1 and the spring 5 retained within a plug body 28 by latchable rear body 27. Grip 32 fits over the plug body 28 to complete the SC style fiber optic connector.

Figure 9:
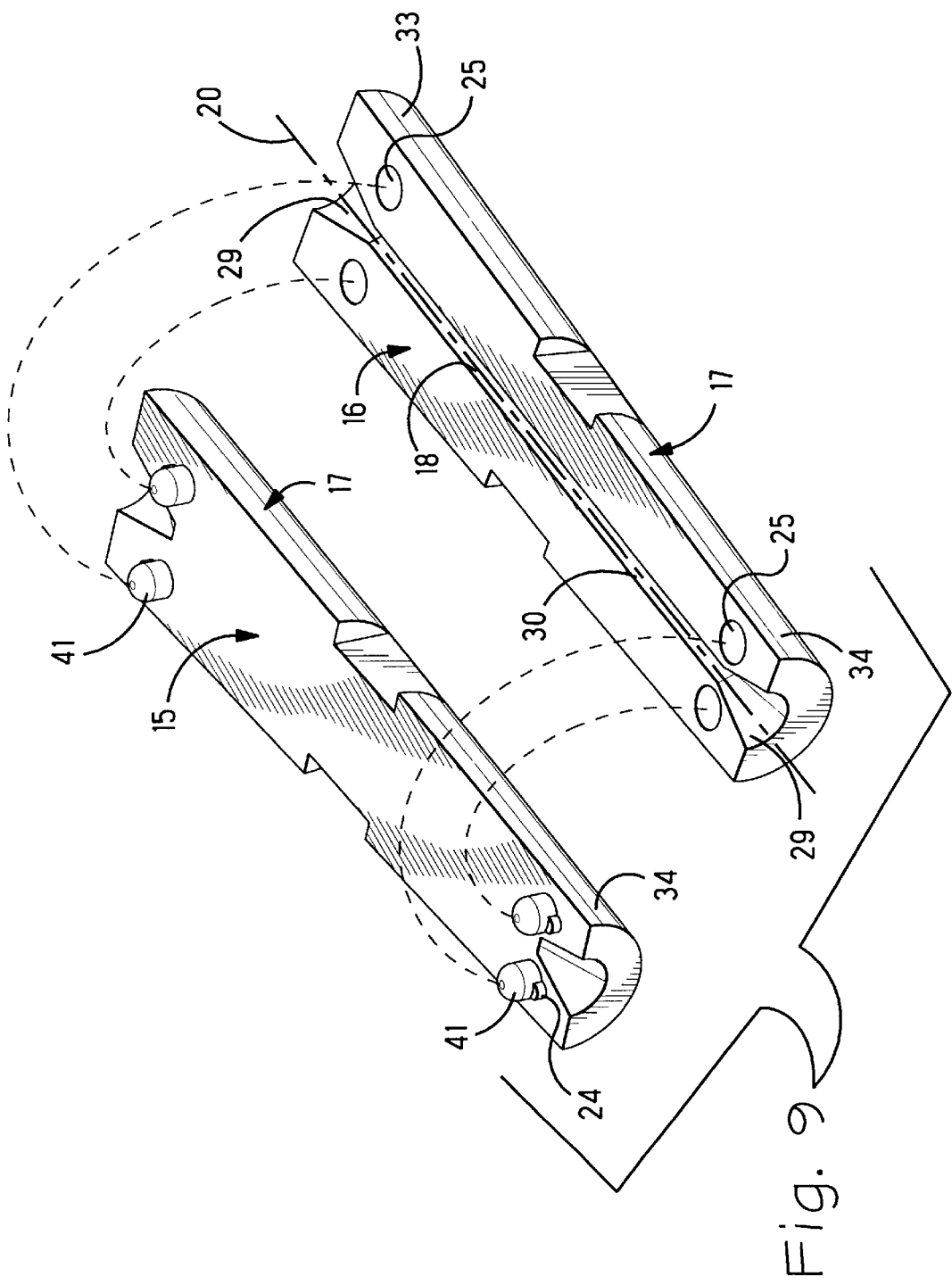
FIG. 9 is a perspective view of an embodiment of a clamping insert according to the teachings of the present invention.
Figure 10:
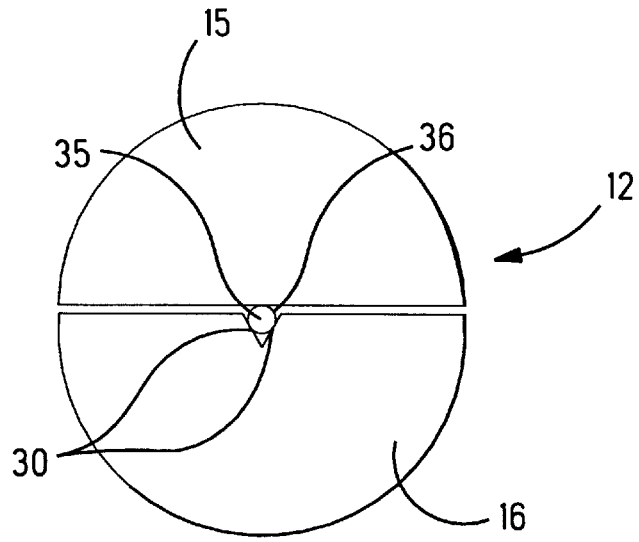
FIG. 10 shows a cross section of an embodiment of a clamping insert according to the teachings of the present invention.
Figure 11:
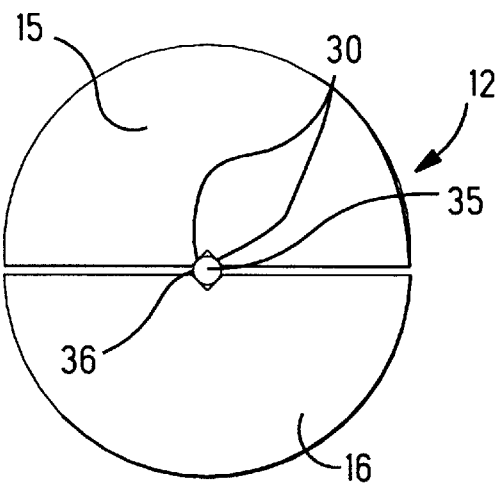
FIG. 11 shows a cross section of an alternate embodiment of a clamping insert according to the teachings of the present invention.
Figure 12:
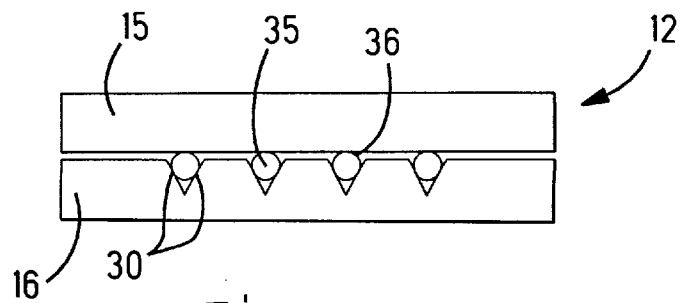
FIG. 12 shows a cross section of an alternate embodiment of a multiple fiber clamping insert according to the teachings of the present invention.
Figure 13:
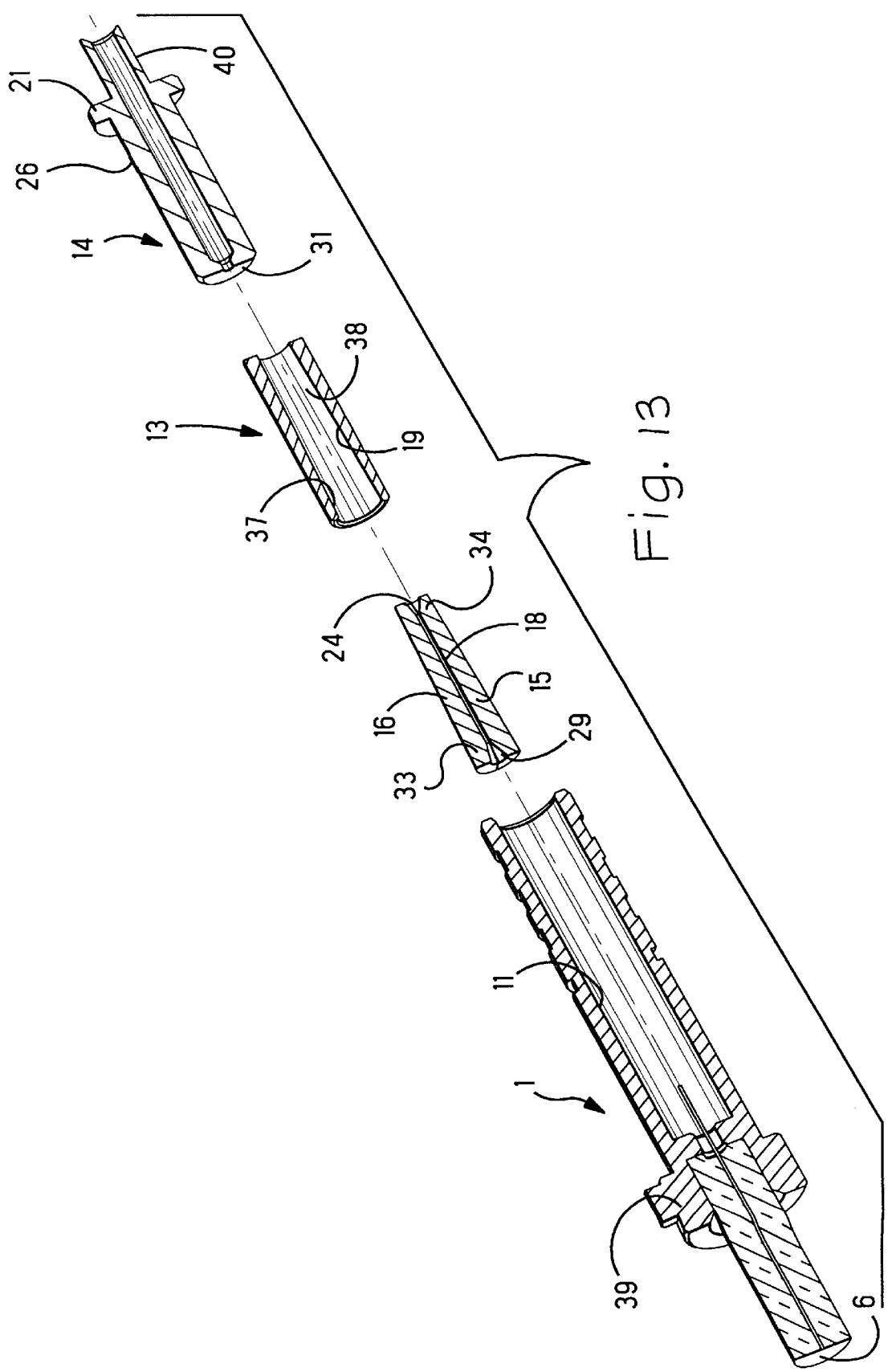
FIG. 13 shows an embodiment of an ST style ferrule and fiber retention mechanism shown in cross sectional exploded perspective.

With specific reference to FIGS. 5 through 8, the ferrule assembly 1 has a forward passage 9, a middle passage 10, and a rear passage 11 coaxial with a longitudinal axis 20. Housed within the rear passage 11 is clamping insert 12, sleeve 13 and axial displacement member 14. The clamping insert 12 comprises first and second clamping members 15, 16. A perspective view of first and second clamping members 15 and 16 is shown in FIG. 9 of the drawings. When placed in cooperating position, the resulting assembly of the first and second clamping members 15, 16 has a tapered outer profile 17 along the longitudinal axis 20. An effective outer diameter of the clamping insert gradually transitions from a larger effective outer diameter portion 33 to a smaller effective outer diameter portion 34 along its length. The larger effective outer diameter portion 33 of the clamping insert 12 is positioned towards a presentation endface 6 of the ferrule assembly 1. The first clamping member 15 further comprises four interlocks 41 and four respective standoffs 24 with a pair of the interlocks 41 disposed at opposite ends of the first clamping member 15 along the longitudinal axis 20. Cooperating interlock receptors 25 are positioned on second clamping member 16 in a position to receive a respective one of the interlocks 41 on the first clamping member 15. The cooperation of the interlock 41 and interlock receptors 25 provide lateral alignment of the first clamping member 15 to the second clamping member 16 as well as assuring a given distance between first and second clamping members 15, 16 when the clamping insert 12 is in an unactuated position for appropriate receipt of the terminating fiber 35. The clamping insert 12 may be made from a suitable plastic such as ULTEM (trademark of General Electric Co.) which is a commercially available polyetherimide. At least one of the first and second clamping members 15, 16 has a longitudinal fiber receiving channel 18. At distal ends of the fiber receiving channel 18 are lead ins 29 comprising a semi-conical notch in communication with the fiber receiving channel 18. In a first embodiment of the clamping insert 12, the second clamping member 16 has a pair of walls 30 inclined towards each other to create the V-groove shaped fiber receiving channel 18. The walls 30 may be inclined at an angle of between 60 and 90 degrees with respect to each other. The first clamping member 15 is flat in an area that mates with the fiber receiving channel 18 of the second clamping member 16. Advantageously, the flat portion of the second clamping member 16 provides for reduced sensitivity of the lateral alignment of the first clamping member 15 with respect to the second clamping member 16. In an embodiment of the fiber receiving channel 18 having the walls 30 inclined at a 60 degree angle with respect to each other, there are three points of contact equidistant along a terminating fiber diameter 36 that is received within the fiber receiving channel 18. Accordingly, a 60 degree V-groove for a flat second clamping member 16 is preferred. In an embodiment of the clamping insert 12 having the fiber receiving channel 18 with walls 30 inclined at a 90 degree angle, the clamping insert 12 maintains three points of contact. The three points of contact to the terminating fiber, however, are not equidistant along the terminating fiber diameter 36. Alternative shapes of the fiber receiving channel 18 include semi-cylindrical, semi-hexagonal, or other cross sectional geometries known to be able to receive a cylindrical fiber. These geometries may increase the number of points of contact along the fiber diameter, however, the geometries may also render the resulting clamping insert 12 more sensitive to manufacturing tolerances. In a second embodiment of the clamping insert 12, each of the first and second clamping members 15, 16 have the fiber receiving channel 18. A cross section of an embodiment is shown in FIG. 11 of the drawings. Each fiber receiving channel 18 comprises a pair of walls 30 inclined towards each other to create a V-groove. The angle of inclination may be from 60 degrees to 90 degrees creating four points of contact to the terminating fiber diameter 36 received in the fiber receiving channel 18. In the second embodiment, the walls 30 angled at 90 degrees with respect to each other results in a geometry providing four points of contact to the fiber equidistant along the fiber diameter 36. For this reason, for the clamping insert 12 having first and second clamping members 15, 16 each having a fiber receiving channel 18, the 90 degree angle of inclination of the walls 30 is preferred. In a third embodiment of the clamping member 12 according to the teachings of the present invention, a second clamping member 16 comprises a plurality of the pairs of walls 30. Each pair of walls 30 is inclined toward each other to create a V-groove fiber receiving channel 18. In the third embodiment, therefore, the clamping insert 12 may receive a plurality of terminating fibers 35, each terminating fiber 35 received within a respective fiber receiving channel 18. Similar principles and embodiments described with respect to the first two embodiments are also applicable to the multiple fiber clamping insert embodiment. An outer profile of the multiple fiber clamping insert may be either elliptical or rectangular in cross section. The outer profile of the clamping insert 12 may be tapered in one direction only, so as to exert a force such that the first clamping member 15 is urged against the second clamping member 16 in a direction perpendicular to the longitudinal axis 20.

The sleeve 13 comprising a generally tubular element having a uniform outer profile is received by the rear passage 11. The sleeve 13 may be made of plastic or metal, such as aluminum. An inner profile 19 of the sleeve 13 is tapered over its length. An effective inner diameter of the sleeve tapers from a larger effective inner diameter portion 37 to a smaller effective inner diameter portion 38. The larger effective inner diameter portion 37 is positioned towards a presentation endface 6 of the ferrule assembly 1. When placed in unactuated engagement, the smaller effective outer diameter portion 34 of the clamping insert 12 is positioned within the larger effective inner diameter portion 37 of the sleeve 13. In general, the outer diameter of the sleeve 13 conforms to the geometric profile of the rear passage 11 for sliding engagement therein. In the embodiment shown, the rear passage 11 has a circular cross section. Accordingly, the sleeve 13 in the embodiments illustrated has a circular outer diameter of uniform size over the length of the sleeve 13. For an embodiment of the sleeve 13 capable of receiving the clamping insert 12 that receives a plurality of fibers, the outer profile of the sleeve 13 may be a uniformly dimensioned rectangular outer profile and the inner profile of the sleeve 13 has a tapered rectangular geometry. Any of the above embodiments may include a longitudinal slit (not shown) in the sleeve 13 to create a discontinuous wall of the generally tubular sleeve for additional compliance.

Figure 5:
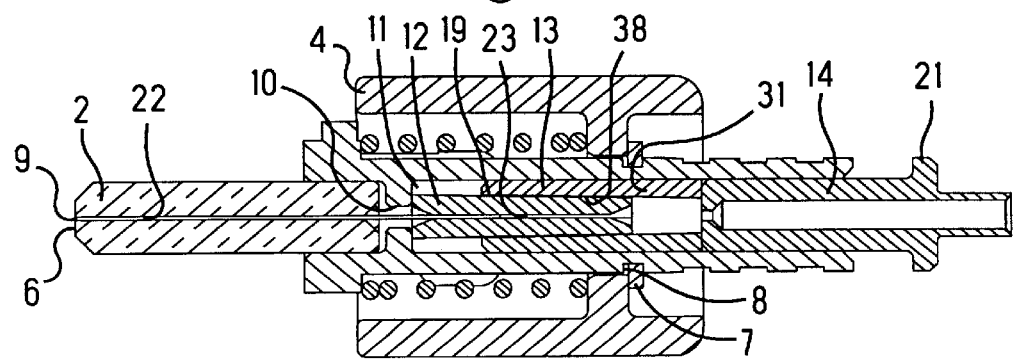
FIG. 5 shows a cross section of an assembled ST style fiber optic connector according to the teachings of the present invention in an unactuated state.
Figure 8:
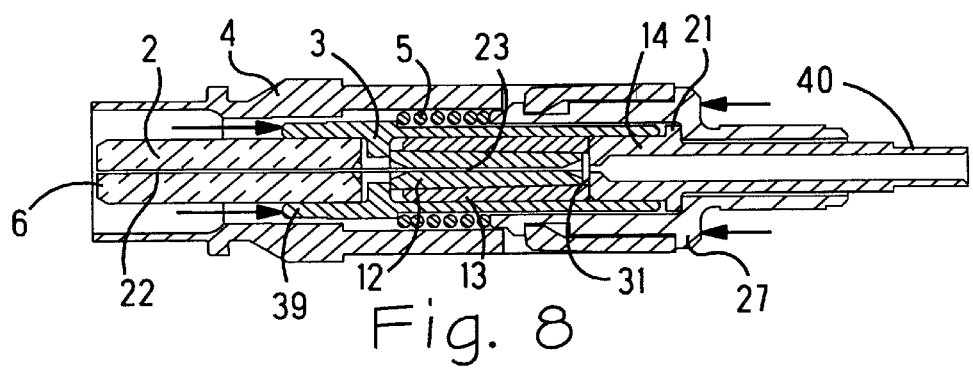
FIG. 8 shows an assembled cross section of an SC style fiber optic connector according to the teachings of the present invention in an actuated state.
Figure 7:
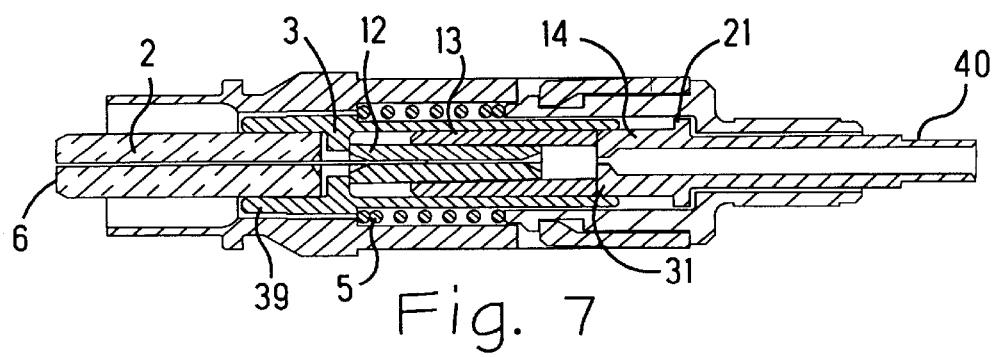
FIG. 7 shows an assembled cross section of an SC style fiber optic connector according to the teachings of the present invention in an unactuated state.

An axial displacement member 14 comprises a generally tubular member having an annular retention band 26 and an annular enlarged collar 21. At an end of the axial displacement member 14 distal from the collar 21, there is a reaction face 31 transverse to the longitudinal axis 20. An outer profile of the axial displacement member 14 is received within and is coaxial with the rear passage 11 of the ferrule assembly 1. FIGS. 5 and 7 of the drawings show the relative placement of the ferrule assembly, the clamping insert 12, the sleeve 13, and the axial displacement member 14 in an unactuated condition.

Actuation of the mechanical fiber retention system for an ST style fiber optic connector according to the teachings of the present invention proceeds as follows. Opposing forces are placed on the collar 21 of axial displacement member 14 and an enlarged collar 39 of ferrule body 3 as shown by force vectors in FIGS. 5 and 7. The opposing forces causes the reaction face 31 of the axial displacement member 14 to engage an end of the sleeve 13. The opposing forces cause the sleeve 13 to telescopically receive the clamping insert 12. The inner profile 19 of the sleeve 13 engages the outer profile 17 of the clamping insert 12. Cooperating tapers of the inner profile 19 of the sleeve 13 and the outer profile 17 of the clamping insert 12 urges a reduction in the size of the outer profile 17 of the clamping insert 12. The force imposed is sufficient to overcome the mechanical strength of the standoffs 24 and to urge the first and second clamping members together to generate a corresponding constriction of the fiber receiving passage 18 of the clamping insert 12. As the fiber receiving passage 18 of the first and second clamping members 15, 16 constrict, it places opposing radial forces on the terminating fiber disposed within the fiber receiving channel 18. Control of the amount of the opposing axial forces provides for appropriate retention of the terminating fiber disposed in the fiber receiving passage 18. Advantageously, actuation of the clamping insert 12 by the sleeve 13 provides uniform radial forces on the fiber therein along the length of the clamping insert 12. After the portion of the axial displacement member that is forward of the collar 21 is received within the rear passage 11 of the ferrule assembly 1, the annular retention band 26 interferes with the inner diameter of the rear passage 11 and is retained in a friction fit. Actuation of the mechanical fiber retention system for an SC style fiber optic connector according to the teachings of the present invention is substantially similar as that described and shown for the ST style connector. With specific reference to FIGS. 6 and 8 to illustrate the distinction, in terminating an ST style fiber optic connector the axial force placed on the axial displacement member 14 is applied directly to the collar 21 by a terminating tool. In contrast, and with specific reference to FIG. 8 of the drawings, an SC style fiber optic connector according to the teachings of the present invention is terminated by placing an axial force on the rear body 27 which engages the collar 21 of the axial displacement 14 transferring the axial force to the axial displacement member 14. Engagement of the reaction face 31 with the end of the sleeve 13 urges telescopic receipt of the clamping insert 12 within the sleeve 13 in the same fashion for both styles of fiber optic connector. After actuation of the mechanical fiber retention system, the buffered terminating fiber 35 is radially crimped at a rear 40 of the axial displacement member 14.

In an alternate embodiment of a fiber optic connector according to the teachings of the present invention, a terminated ferrule assembly may be used to couple directly into a receiving adapter without the use of the coupling nut or grip. In this simplified embodiment, the housing and spring are not assembled to the ferrule assembly. The receiving adapter essentially becomes the housing by receiving and holding the ferrule assembly as well perform the mating to a mating fiber optic connector or other mating fiber optic element.

An alternative embodiment to the mechanical fiber retention system according to the teachings of the present invention includes an additional consistent force element such as a wave washer or BELLEVILLE washer disposed between the sleeve 13 and the reaction face 31 of the axial displacement member 14. The consistent force element exhibits compliant movement at a threshold force value and maintains the threshold force over a given range of axial travel. This embodiment provides increased control of the axial force applied to the sleeve and therefore the radial force applied to the clamping insert 12 and terminating fiber 35 over a greater range of axial displacement.

In a pre-polished embodiment of a fiber optic connector according to the teachings of the present invention, a fiber stub 22 is epoxied in forward passage 9 of the ferrule assembly 1. The presentation endface 6 of the stub is polished in a factory environment. A splicing endface 23 of the stub is positioned either within the forward passage of the ferrule capillary 2 or in the fiber receiving channel 18 of clamping insert 12.

In an embodiment in which the splicing endface 23 of the stub 22 is positioned within the fiber receiving channel 18 of the clamping insert 12, alignment of the splicing endface 23 to the terminating fiber 36 as well as retention of the terminating fiber 35 is accomplished by the clamping insert 12. Index matching gel is disposed between the splicing endface 23 and the terminating fiber 35 to improve light transmission therebetween. Alignment performed in the clamping insert is particularly advantageous in multiple and single fiber ferrule assembly embodiments. Alternatively, the splicing endface 23 is disposed in the ferrule capillary 2. In this alternative embodiment, alignment is performed by the forward passage 9 of the ferrule capillary 2 and clamping retention is performed by the clamping insert 12.

In a fiber feed embodiment, there is no fiber stub 22 and a terminating fiber 35 is positioned, retained, and then cleaved and polished. Advantageously, use of the same mechanical fiber retention system for both a fiber feed and a fiber stub embodiment provides manufacturing economies of scale.

An advantage of the embodiments disclosed is provision of a mechanical fiber retention fiber optic connector that may be more easily and reliably terminated for prepolished and fiber feed embodiments. Other advantages of the invention are apparent from the detailed description by way of example and from the accompanying drawings and from the spirit and scope of the appended claims.

We claim:

1. A fiber optic connector comprising:
   a housing retaining a ferrule assembly having a hollow rear portion defining a rear passage along a longitudinal axis of the ferrule assembly, a ferrule capillary, a ferrule body and a fiber stub having a presentation endface and a splicing surface disposed within the ferrule capillary, a mechanical fiber retention system disposed within the ferrule assembly, the mechanical retention system comprises a clamping insert to receive the splicing endface of the fiber stub and a sleeve disposed within the rear passage, the sleeve receiving the clamping insert in telescopic engagement and exerting a radial force on the clamping insert.

2. A fiber optic connector as recited in claim 1 and further comprising an axial displacement member moving the sleeve into telescopic engagement with the clamping insert.

3. A fiber optic connector as recited in claim 2 and further comprising a wave washer disposed between the sleeve and the axial displacement member.

4. A fiber optic connector as recited in claim 1 wherein the clamping insert also receives a terminating fiber.

5. A fiber optic connector as recited in claim 1 wherein the ferrule capillary also receives a terminating fiber.

6. A fiber optic connector as recited in claim 1 wherein the clamping insert further comprises a pair of walls inclined towards each other defining a fiber receiving channel.

7. A fiber optic connector as recited in claim 6 and further comprising a plurality of the pairs of walls defining a respective plurality of the fiber receiving channels.

8. A fiber optic connector as recited in claim 1 wherein an outer profile of the clamping insert tapers from a larger effective outer diameter to a smaller effective outer diameter.

9. A fiber optic connector as recited in claim 8 and further comprising an axial displacement member urging the sleeve into telescopic engagement with the clamping insert.

10. A fiber optic connector as recited in claim 1 wherein an inner profile of the sleeve tapers from a larger effective inner diameter to a smaller effective inner diameter.

11. A fiber optic connector as recited in claim 10 wherein an outer profile of the clamping insert tapers from a larger effective outer diameter to a smaller effective outer diameter.

12. A fiber optic connector as recited in claim 11 and further comprising an axial displacement member urging the sleeve into telescopic engagement with the clamping insert.

13. A fiber optic connector as recited in claim 10 and further comprising an axial displacement member urging the sleeve into telescopic engagement with the clamping insert.

14. A fiber optic connector as recited in claim 1 wherein the sleeve has a longitudinal slit to define the sleeve as a generally tubular element having a discontinuous wall.

15. A fiber optic connector comprising:
   a housing,
   a ferrule assembly retained within the housing, the ferrule assembly comprising a hollow rear portion defining a rear passage along a longitudinal axis of the ferrule assembly, a ferrule capillary, a ferrule body and a fiber stub disposed within the ferrule catillary, the fiber stub further comprises a oresentation endface and a splicing endface,
   a sleeve disposed in the rear passage of the ferrule assembly,
   a clamping insert disposed in the sleeve to receive the splicing endface of the fiber stub, the sleeve telescopically receiving the clamping insert and exerting a force on the clamping insert perpendicular to the longitudinal axis.

16. A fiber optic connector as recited in claim 15 and further comprising an axial displacement member moving the sleeve into telescopic engagement with the clamping insert.

17. A fiber optic connector as recited in claim 16 and further comprising a wave washer disposed between the sleeve and the axial displacement member.

18. A fiber optic connector as recited in claim 15 wherein the sleeve has a longitudinal slit to define the sleeve as a generally tubular element having a discontinuous wall.

19. A fiber optic connector as recited in claim 15 wherein the clamping insert also receives a terminating fiber.

20. A fiber optic connector as recited in claim 15 wherein the ferrule capillary also receives a terminating fiber.

21. A fiber optic connector as recited in claim 15 wherein the clamping insert further comprises a pair of walls inclined towards each other defining a fiber receiving channel.

22. A fiber optic connector as recited in claim 21 and further comprising a plurality of the pairs of walls defining a respective plurality of the fiber receiving channels.

23. A fiber optic connectors as recited in claim 15 wherein an outer profile of the clamping insert tapers from a larger effective outer diameter to a smaller effective outer diameter.

24. A fiber optic connector as recited in claim 23 and further comprising an axial displacement member urging the sleeve into telescopic engagement with the clamping insert.

25. A fiber optic connector as recited in claim 15 wherein an inner profile of the sleeve tapers from a larger effective inner diameter to a smaller effective inner diameter.

26. A fiber optic connector as recited in claim 25 wherein an outer profile of the clamping insert tapers from a larger effective outer diameter to a smaller effective outer diameter.

27. A fiber optic connector as recited in claim 26 and further comprising an axial displacement member urging the sleeve into telescopic engagement with the clamping insert.

28. A fiber optic connector as recited in claim 25 and further comprising an axial displacement member urging the sleeve into telescopic engagement with the clamping insert.

29. A ferrule assembly for a fiber optic connector comprising:
   a hollow rear portion defining a rear passage along an longitudinal axis,
   a ferrule capillary, a ferrule body and a fiber stub disposed within the ferrule capillary, the ferrule stub further comprising a presentation end face and a splicing end face,
   a sleeve having an inner profile which tapers from a larger effective inner diameter to a smaller effective inner diameter disposed in the rear passage, and
   a clamping insert being disposed in the sleeve to receive the splicing end face of the fiber stub, and having an outer profile which tapers from a larger effective outer diameter to a smaller effective outer diameter.

30. A ferrule assembly as recited in claim 29 and further comprising an axial displacement member moving the sleeve into telescopic engagement with the clamping insert.

31. A ferrule assembly as recited in claim 30 and further comprising a wave washer disposed between the sleeve and the axial displacement member.

32. A ferrule assembly as recited in claim 29 wherein the sleeve has a longitudinal slit to define the sleeve as a generally tubular element having a discontinuous wall.

33. A ferrule assembly as recited in claim 29 wherein the clamping insert also receives a terminating fiber.

34. A ferrule assembly as recited in claim 29 wherein the fiber stub further comprises a presentation endface and a splicing endface, the splicing endface of the fiber stub being received by the ferrule capillary.

35. A ferrule assembly as recited in claim 34 wherein the ferrule capillary also receives a terminating fiber.

36. A ferrule assembly as recited in claim 29 wherein the clamping insert further comprises a pair of walls inclined towards each other defining a fiber receiving channel.

* * * * *